(12) United States Patent
Blum et al.

(10) Patent No.: US 6,966,013 B2
(45) Date of Patent: Nov. 15, 2005

(54) METHOD AND SYSTEM FOR PERFORMING AUTOMATED REGRESSION TESTS IN A STATE-DEPENDENT DATA PROCESSING SYSTEM

(75) Inventors: Michael Stefan Blum, Aidlingen (DE); Toni Friedrich, Eutingen (DE)

(73) Assignee: International Business Machines Corporation, Armonk, NY (US)

( * ) Notice: Subject to any disclaimer, the term of this patent is extended or adjusted under 35 U.S.C. 154(b) by 623 days.

(21) Appl. No.: 10/138,895

(22) Filed: May 2, 2002

(65) Prior Publication Data

US 2003/0018932 A1    Jan. 23, 2003

(30) Foreign Application Priority Data

Jul. 21, 2001 (EP) ................... 01117600

(51) Int. Cl.[7] ............................. G06F 11/00
(52) U.S. Cl. ................. 714/38; 714/715; 717/124
(58) Field of Search ............. 714/38, 715, 39; 717/131, 124, 125

(56) References Cited

U.S. PATENT DOCUMENTS

| | | | | |
|---|---|---|---|---|
| 5,652,835 A | * | 7/1997 | Miller | 714/38 |
| 5,673,387 A | * | 9/1997 | Chen et al. | 714/38 |
| 5,694,540 A | | 12/1997 | Humelsine et al. | 395/183.14 |
| 5,754,760 A | * | 5/1998 | Warfield | 714/38 |
| 5,758,062 A | * | 5/1998 | McMahon et al. | 714/38 |
| 6,002,869 A | * | 12/1999 | Hinckley | 717/124 |
| 6,061,643 A | | 5/2000 | Walker et al. | 702/123 |
| 6,067,639 A | * | 5/2000 | Rodrigues et al. | 714/38 |
| 6,301,701 B1 | * | 10/2001 | Walker et al. | 717/125 |
| 6,421,793 B1 | * | 7/2002 | Lester et al. | 714/37 |
| 6,622,298 B1 | * | 9/2003 | Stamm | 717/125 |
| 6,769,114 B2 | * | 7/2004 | Leung | 717/124 |
| 6,901,583 B1 | * | 5/2005 | Park | 717/134 |
| 2001/0052089 A1 | * | 12/2001 | Gustavsson et al. | 714/38 |

OTHER PUBLICATIONS

Yau, Stephen S. et al. "A Method of Revalidating Modified Programs in the Maintenance Phase", Proc. Of 11th Annual International Computer Software and Applications Conference (COMPSAC), pp. 272-277, IEEE Comp. Soc., Oct. 7-9, 1987.

\* cited by examiner

*Primary Examiner*—Scott Baderman
*Assistant Examiner*—Paul L. Contino
(74) *Attorney, Agent, or Firm*—David A. Mims, Jr.

(57) ABSTRACT

Disclosed are a method and system for performing regression tests in a state-dependent data processing environment where data are processed by means of at least one function having a signature of defined parameters and corresponding values. A regression test is performed using at least one pre-determined set of test data and one pre-recorded function test case corresponding to said signatures and being used to execute said at least one pre-recorded function test case. The proposed mechanism particularly comprises the step of adapting said at least one function test case or said at least one set of test data to any changed signatures caused by a state transition of said data processing system. The mechanism thus provides automated regression tests in such a data processing environment and enables re-execution of a regression test in a changed context of the underlying data processing environment.

5 Claims, 5 Drawing Sheets

| index | API | i/o | parameter | value |
|---|---|---|---|---|
| 1 | create account | i | customer surname | Mozart |
| 2 | create account | i | customer firstname | Amadeus |
| 3 | create account | i | street | Gassenhauer 5 |
| 4 | create account | i | city | Wien |
| 5 | create account | o | account number | 1234567890 |
| 6 | create account | o | account internal identifier | 01-01-00.00:00:00 |
| 7 | search account | i | customer surname | Mozart |
| 8 | search account | i | customer firstname | Amadeus |
| 9 | search account | i | street | Gassenhauer 5 |
| 10 | search account | i | city | Wien |
| 11 | search account | i | account number | 1234567890 |
| 12 | search account | o | account internal identifier | 01-01-00.00:00:00 |
| 12 | inquiry account | i | account internal identifier | 01-01-00.00:00:00 |
| 13 | inquiry account | o | balance | 0,000.000 |
| 14 | posting | i | account internal identifier | 01-01-00.00:00:00 |
| 15 | posting | i | amount | 1,000.00 |
| 16 | posting | o | balance | 1,000.00 |

METHOD AND SYSTEM FOR PERFORMING AUTOMATED REGRESSION TESTS IN A STATE-DEPENDENT DATA PROCESSING SYSTEM

BACKGROUND OF THE INVENTION

The invention relates generally to testing of computer hardware and/or software and, more specifically, to a method and system for performing regression tests in a state-dependent data processing or information handling system environment. In addition, the invention concerns an according system-independent regression test apparatus.

Known information handling or data processing systems are implemented by hardware, software or both. They often use predefined functions for processing input data sets of large data repositories, e.g. functions like 'create account' or 'list account' as those typically used in a banking environment. These systems are enhanced and changed very often during their development and life cycle wherein such activities may introduce errors in the existing functions insofar as originally used signatures (parameter definitions) become invalid. This fact generates an extensive need for regression tests.

Thereupon, regression tests are also used during software development, particularly when a software programmer or developer designs a new program or makes changes to an existing program. After any modification of a program it is not sufficient to test only the changed or enhanced part of that particular piece of program. The programmer typically subjects the program to a plurality of regression tests to ensure that the program performs its intended functions.

It is emphasized that testing changes to an existing hardware or software system is a more time consuming endeavor than testing a completely new system, in particular program code, because changes often inadvertently have some impact on other elements of the entire underlying system. Studies show that, compared to new code, changes of a program code are ten times more likely to contain bugs.

In such a software development scenario, U.S. Pat. No. 5,694,540 discloses a method and a system for regression testing of a recompiled main software program which allow to perform only a limited regression test that has the same level of testing as if the main program were tested using an expanded regression test that tests virtually all of the software modules forming the program. More particularly, if an error is found in the main program, it is documented in a modification request which a programmer thereafter uses to track down and identify the software module(s) that needs to be modified to deal with the error. At that point, the programmer modifies the identified software module and also designs a current test program to test the recompiled program to determine if the error has been corrected and that the modification does not affect some other aspect of the program. The modified module and test program are then associated with an identifier identifying the associated modification request. The facility then locates all modification request identifiers respectively associated with prior modification made to the identified software module and executes the test programs associated with those modifiers as well as the current test program against the recompiled version of the main program.

More particularly, the above approach provides a test management program connected to a test case database that creates a test template. Uncovered errors are documented and identified as so-called 'Modification Requests' (MRs). The programmer modifies the source file(s) of the program in order to correct the identified errors. The programmer also designs a test that may be applied to a master program when it is recompiled to substitute the modified source file(s). The test is designed to test the master program to determine if the errors documented in the MR is actually be corrected. In particular, it is therein proposed that only those test cases associated with the source file(s) that have been changed and thus associated with the corresponding MR(s) are invoked to regression test the recompiled master program. The mentioned process of updating the source code is done parallel with the updating of the test code.

In addition, a status information table is updated using the test results i.e. which test cases passed and which test cases failed.

In addition, a test unit must be re-run if any of the program entities it covers has changed. However, it is difficult to identify the dependency between a test unit and the program entities that it covers. In order to overcome these obstacles, selective retesting techniques have been previously described in the literature, e.g. Yau, Stephen S. and Kishimoto, Zenichi, "A Method for Revalidating Modified Programs in the Maintenance Phase", in Proceedings of the $11^{th}$ Annual International Computer Software and Applications Conference (COMPSAC), pages 272–277, IEEE Computer Society, Oct. 7–9, 1987 which describes a selective retesting technique for partition testing.

Another approach in the field of software engineering is known from U.S. Pat. No. 5,673,387 which discloses a system and method for selective regression testing of a software system that determines which test units or subset of a test suite must be re-run after a modification to or a new version of a software system. The entities which are covered by each test unit are identified. When the software system is modified the entities which were changed by the modification are identified. The test units which need to be re-run are determined by analyzing the change information and the coverage information to select those test units that cover changed entities. When the software is changed, the set of changed entities is identified. This set is then compared with each set of covered entities for the test units. If one of the covered entities of a test unit has been identified as changed, then the test unit is re-run. Hereby a user generates a list of changed entities to determine which test units must be re-run in the case of a hypothetical system modification.

Thereupon, complex and mission-critical business applications typically contain a large number of on-line transactions, each of which consisting of considerable functionality. The software application quality therefore largely depends on extensive testing of the functionality of each of the on-line transactions to ensure completeness and correctness. Traditional automated application testing strategies have only been partially successful in minimizing the manual nature of transaction testing. Typically a keystroke-capture technique is employed wherein the computer memorizes the keystroke and mouse movements performed by a test operator enabling the computer to replay the test at a later time for retesting the application. But the test data generated by the keystroke-capture technique is normally non-maintainable and incomprehensible, and therefore, any changes to the test data require re-creation of the test to enable the entire test to be re-recorded for subsequent playback.

As already mentioned, most regression tests in such a scenario rely on a large set of test data. To repeat the tests, complex systems require an update of the test data in order to adapt them to a new functional context of the system.

In particular, another shortcoming of traditional automated testing techniques is preparation of the test data. Once the test data is developed, maintaining such test data is virtually impossible due to the manually developed origin. It is known, that application programmers heretofore create non-meaningful test data that often does not actually properly exercise the transaction or application undergoing the testing process.

A corresponding method of regression testing of transaction based software applications during the development and other life cycle phases of the software is disclosed in U.S. Pat. No. 6,061,643. Regression tests comprised of test cases containing test data describe the target test at a functional or behavioral level and executes a regression test at a physical level. The functional level accommodates changes to the transaction such as the moving of text fields to other locations within a frame or the changing of the presentation of particular fields from one form to another. A test operator performs a manual test and simultaneously records the test. The test data is in a robust functional description of the transaction such that physical modifications to the transaction during software development preserve the viability of the test data for execution in the modified transaction. A particular component facilitates the creation of test cases for transactions by monitoring the performance of the test in the transaction itself. A test report is compared with a control test report to verify the lack of regression of the transaction. Accordingly, changes to the transaction therefore allegedly shall not result in unusable test data.

The above approaches have in common the drawback that there is a large number of pitfalls which are expensive to uncover by experience and that they involve large test sets of unknown content, lots of redundant tests, and bugs that slip through even though we supposedly used regression testing to eliminate the side effects of changes.

In addition, the known approaches can not automatically perform regression tests in a state-dependent data processing system, e.g. a transaction system comprising unpredictable states at the time of the regression test and being non-resettable to an initial state at the beginning of the test, thus requiring considerable user interaction or a special test program supporting the underlying logic for handling such unpredictable state changes. While executing the test, the state of each subtask may be unpredictable for some required parameter values as well.

SUMMARY OF THE INVENTION

It is therefore an object of the present invention to provide a method and system for performing regression tests in a beforehand discussed state-dependent data processing or information handling system environment.

It is a further object to provide automated regression tests in such a system environment.

It is a further object to provide a method and system enabling re-execution of a regression test in a changed context of the underlying system environment.

It is another object to provide such a method and system which allow for a continuous adaptation of signatures and/or test data during several stages of a regression test to accordingly changed environment contexts.

It is yet another object to allow for a continuous and automated adaptation of said signatures and/or test data.

It is still yet another object to provide a regression test apparatus which is independent of the respective underlying data processing environment in view of functional or signatures.

The above objects are achieved by the features of the independent claims. Advantageous embodiments are subject matter of the subclaims.

The idea underlying the invention is to use the results of a preceding regression test stage for updating signatures and/or test data of a following regression test stage with regard to a new data processing context with changed signatures. Preferably, the values obtained during previous test cases can be looked up as reference values.

In other words, when performing a regression test typically comprised of a number of test stages, each test stage based on a different set of test data, it is proposed to adapt the corresponding test data in each test stage to a new underlying context of the stage-dependent data processing system.

The proposed mechanism enables to automatically resolve non-consistent signatures, e.g. pre-defined parameter fields, between said pre-recorded function test cases and/or the test data between the recording and regression test thus not requiring any user interaction.

Further automation of the regression tests can be achieved by providing parameter or parameter field allocation rules which can be used for future regression tests.

In a preferred embodiment, each of the sets of test data comprises a sequence of function calls via corresponding interfaces wherein each function call comprises a set of input and output test data for the purpose of function verification. During a first state of the data processing system, i.e. a first "context" as understood herein, a first regression test is performed based on a first set of test data whereby applying said first set of test data to at least one function via a corresponding interface, gathering first actual results based on said first set of test data, and comparing said first actual results with first expected results. During a second state of the data processing system, a second set of test data is provided to at least one of said interfaces, wherein said data processing system being in a second state, and wherein the second set of test data is updated in respect of a corresponding new context of the data processing system due to the state transition from the first state to the second state. The second set of test data is then applied to a function corresponding to the interface and actual results gathered based on the second set of test data. At the end of that test stage, the actual results are compared with at least second expected results.

In another embodiment, field allocation or association rules are derived from previously recorded test data.

It is emphasized that the different test stages mentioned beforehand must not necessarily succeed one another immediately but can also succeed one another with an arbitrary time lying between two stages.

The invention, in addition, concerns a system-independent regression test apparatus that has implemented a technical interface of a data processing system and thus does not require any enhancements for the logical changes of the systems interfaces.

The invention therefore allows for automatically performing test data updates for regression tests in the above mentioned state-dependent data processing systems and thus for handling the test data during regression testing from the development through maintenance phases.

BRIEF DESCRIPTION OF THE DRAWINGS

In the following, referring to the accompanied drawings, the present invention is described in more detail by way of embodiments from which further features and advantages of the invention become evident. In the drawings

DETAILED DESCRIPTION OF THE PREFERRED EMBODIMENT

Figure 1:
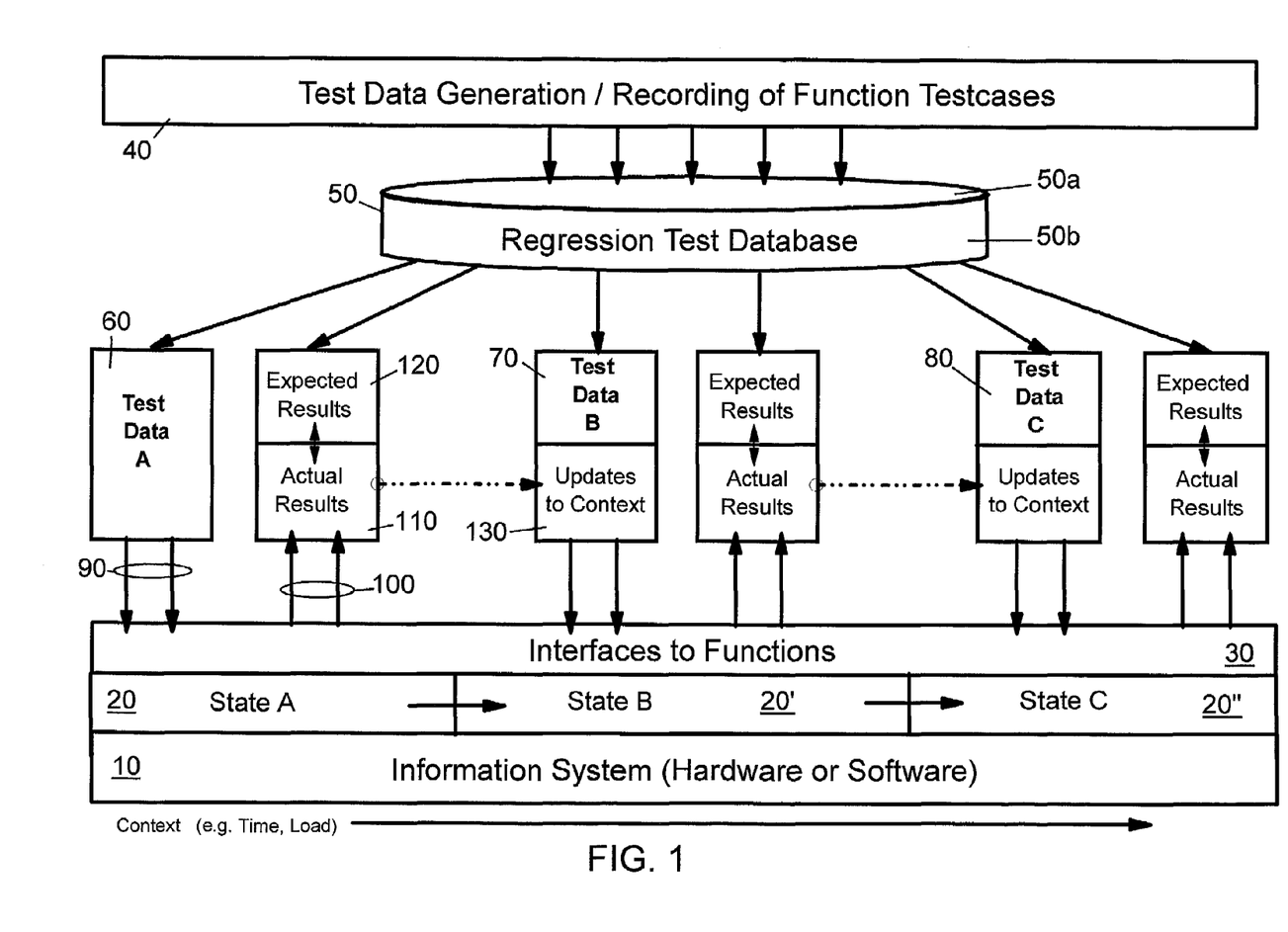
FIG. 1 is an overview block diagram illustrating a regression test system environment in accordance with the present invention.

As shown in the block diagram depicted in FIG. 1, a regression test system environment in accordance with the invention consists of an information system 10, e.g. any digital hardware or software or a combination thereof, which is state-dependent and in the present example changes its states from a State A 20 to a State B 20' and then to a State C 20". The information system has implemented a number of functions which can be accessed via interfaces 30. As described in more detail in the following, these functions are defined by parameters which contain a value. In particular, the parameters are defined by signatures by which certain values can be associated with certain parameters.

A regression test is based on pre-generated test data and prerecorded function test cases 40, each of them having a signature 50a and a set of test data 50b, which are stored in a regression test database 50. Such a signature 50a together with its corresponding set of test data 50b define test data 60, 70, 80, each of them being used in the above mentioned different information system states 20–20".

Now referring to test case A 60, a first regression test stage is performed using a pre-recorded function 50a together with a set of pre-defined data 50b. The test case is then applied 90 to a corresponding function of the underlying information system 10 via an appropriate interface 30. Applying the test case results in obtained 100 actual results 110, which are compared with expected results 120, the latter also obtained from the regression test database 50.

It is noteworthy that the present example assumes that the signatures of the test data A 60 used the first regression test stage are consistent with the corresponding functions in the information system 10 and thus updating of the signatures in accordance with the invention is not required here.

Such an updating procedure is illustrated with test data B 70. In that case the test data B 70 obtained from the regression test database 50 are first updated 130 in accordance with the new context due to state transition from State A 20 to State B 20' of the underlying information system 10, before they can be used for a second stage of the regression test. The details of that updating procedure are explained in more detail referring to FIGS. 2–4.

The underlying information (handling) system thus has the following characteristics:

It has a state, which is neither reproducible nor can be reset to an initial state;
the state is influenced by the context of the system;
it is callable for each function;
each function call may change the state.

A regression test in the following is assumed to have the following characteristics:

It consists of a set of test cases;
each test case is defined as a sequence of function calls;
a function call has a set of input and output test data for the purpose of function verification;
parts of the test data are dependent on the state of the system to be tested and cannot be reused for function call verification.

Referring again to FIG. 1, the test cases and two sets of test data comprising a sequence of function calls and each function call having a set of input and output test data for the purpose of function verification.

A first block represents a functional unit for generating test data, preferably based on prerecorded function test cases. The test data are input to a regression test database, containing the request and reply data of the recorded functions, e.g. an IBM DB2 database or an ordinary file system. From the database different sets of test data A–C are gathered and transferred to the underlying data processing system via one or more interfaces to functions. For instance, the data processing system can be a computer program which performs a number of functions when being in operation or a computer hardware like an integrated circuit processing chip or an application-specific integrated circuit (ASIC) wherein the regression test serves for logic verification of the chip. In the shown scenario, at first test data A are transferred to the data processing system during an assumed state I of the system and corresponding response results are obtained. The actual results obtained by test data A are compared in another block with expected results and found out whether they match or not.

It is further assumed that the data processing system, after a first part of the entire regression test, changes over from state I to a state II. According to an also changed context e.g. concerning time or load, the test data B are first updated to the new context using the actual results or part thereof obtained in the first step, and only then transferred to the data processing system under test. As in the preceding step, the obtained actual results are compared with the expected results. As in the preceding step, the system is accordingly assumed to change over from the state II to another state III.

In a third step, according to the again changed context due to the new state III, the test data C are first updated to the new context using the actual results or part thereof obtained in the second step, and only then transferred to the data processing system. As in the preceding steps, the obtained actual results are compared with expected results.

It should be noted that the test A does not necessarily follow immediately after the recording of the test cases, and accordingly the time between test A and B etc.

In case that the pre-mentioned three actual and correspondingly expected results match, the system is assumed to operate faultless. Otherwise, if at least one comparison reveals a differing actual and expected result, then the system is assumed not to operate correctly i.e. faultless.

The above described regression test can be performed manually or automatically. It is of course highly desirable to have automated regression tests to keep turnaround times small and minimize the human resources needed. Trivial updates, which are not dependent on the state of the system like adjusting date or time fields, are already state of the art for regression testing and not regarded in the present context. But, it is emphasized hereby, that for state-dependent data processing systems no process is known which allows to update test data to the actual system state fully automatically. It is noteworthy that the state of the art approach to test such systems is the development of specific regression test logic which itself has the drawback to be potentially error prone and hard to enhance. Nonetheless this is a costly way for the implementation of an automated regression test for the above systems.

Figure 2:
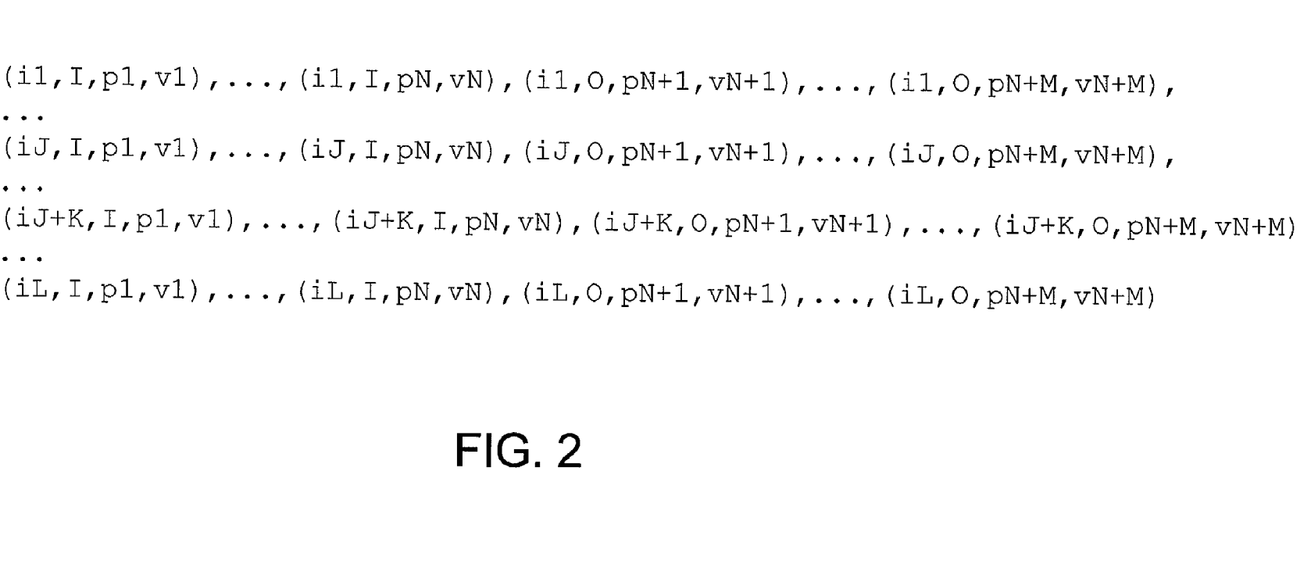
FIG. 2 is an exemplary test sequence in accordance with the invention.

Deriving (field) allocation or association rules from previous recorded set of test data will now be illustrated referring to FIG. 2. The proposed process for automatic test data updates in state-dependent data processing systems, as mentioned above, is based on rules for those updates which can be applied for the implementation of a simple regression test apparatus if the following conditions exist:

Recent set of test data has been recorded when function tests were performed;
a correct interface description for all functions to test is available;
a subset of test data which needs to be updated can be specified;
the value of the test data that need to be updated can be identified and adapted to the actual state of the system.

The required analysis for test data updates can formally be described as follows. The execution of data processing systems interfaces is hereby defined as a sequence of call-elements being quadruples of (<interface-identifier>×{I,O}×<parameter-identifier>×<value>). {I,O} is a set for the description of input and output modes. A representation of such a sequence is depicted in FIG. 2. The output values used as input for next interfaces can be described as relations between call elements wherein the call elements are dependent on a current state the data processing system has. An output/input link hereby defines a relationship between two call elements.

Let iJ and iJ+K identify two interfaces shown in the sequence above. Interface iJ is executed J−1 steps after the first interface (i1). The interface iJ+K is executed K steps after the interface iJ.

An output/input link exists for a pair of call elements (iJ,o,pO,vO),(iJ+K,i,pI,vI) if the parameter-identifiers pO and pI can be mapped in an unambiguous manner and the values vO and vI are equal in the given context. This does neccessarily mean that vO and vI of an output/input link are equal in all existing contexts. Further the distance calculated by K−J must be the shortest possible.

For the reexecution, the following conditions must be valid:
iJ was executed;
the value vI is updated by vO before an interface iJ+K is executed;
VI,vO,iJ+K are elements of an output/input link.

In the following, two application scenarios are described in order to further illustrate the invention. As a first application, an account representation used in Banking Systems is described.

In Banking Systems customers have arrangements with their Financial Institute. After an account has been created, the system may perform various functions related to it. Because of an effective representation of entities within the system (e.g. keyed access of database tables) entities like accounts are often represented by unique internal identifiers. These identifiers are created dependent on the actual time of the systems. For all subsequent functions on this new account you have to use this unique identifier as reference. The recorded data will contain an account identifier that needs to be updated at the time the regression test is performed.

Figure 3:
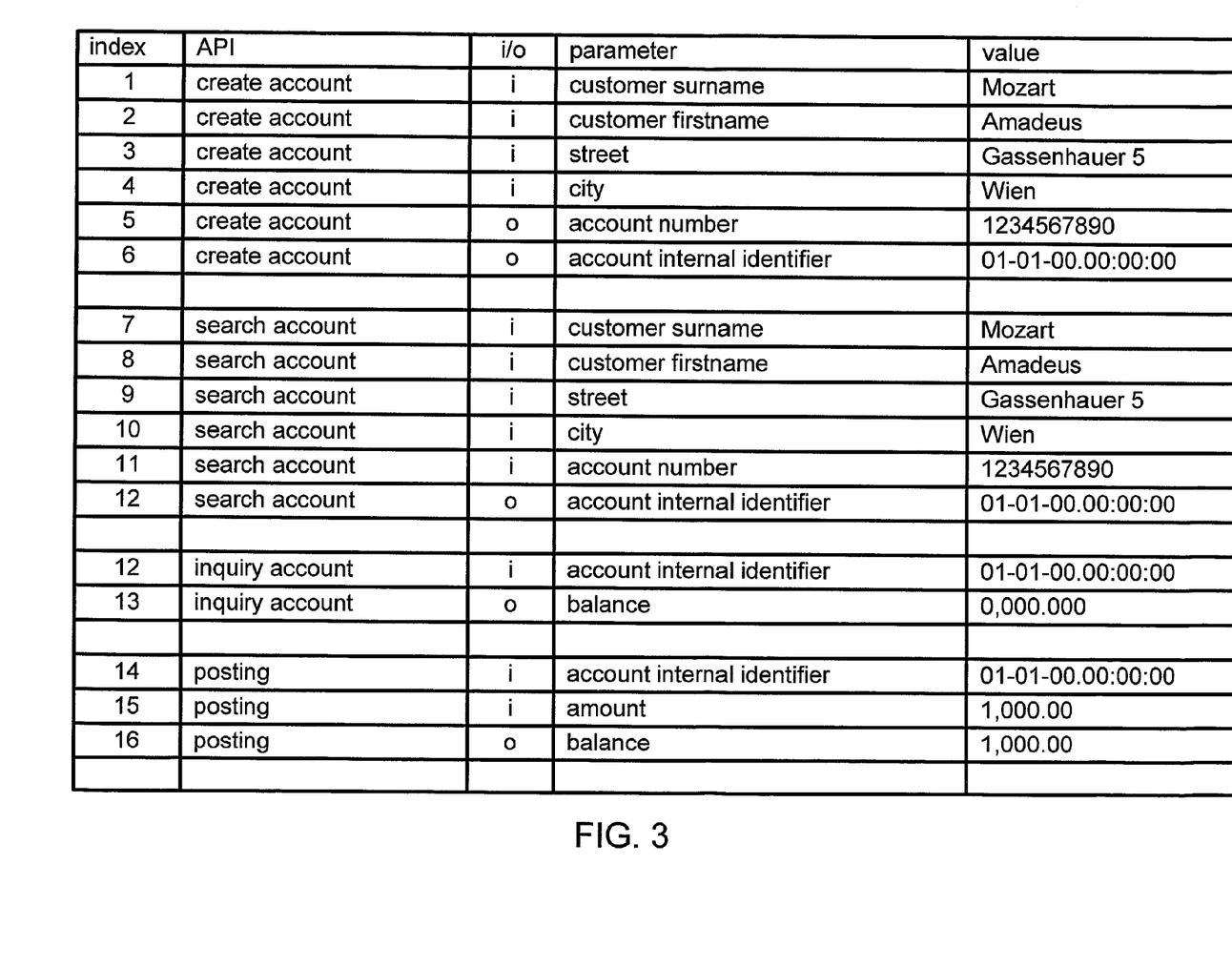
FIG. 3 is a table with exemplary functions and parameters for use with the invention in the field of account representation in a banking system environment.

The table depicted in FIG. 3 shows a scenario for the creation, search, inquiry and posting of such an account in accordance with the invention. An Application Programming Interface (API) called 'create account' is traced from index 1 to 6. It created the account with number '1234567890' and the account internal identifier '01-01-00.00:00:000'. An API 'search account' from 7 to 11 searched in the data base for the account number of the given customer 'Amadeus Mozart . . . ' and returned account internal identifier of the created account, i.e. again '01-0100.00:00:000'. A further API 'inquiry account' from 13 to 14 returned for the account number the current balance. Another API 'posting' from 15 to 17 takes posted an amount of 1.000,00 to this account. The new balance, i.e. 1.000,00 was returned.

At generic test-driver that knows only what fields are timestamps which have to be sent back now gets the unknown correlation information (which timestamp in the reply message have to be passed back from which timestamp of the request) by simply generating that missing information from the values of the recorded test data. Although the (old) timestamps are totally invalid for the actual test case, they can be perfectly used to determine which parameter of the requests corresponds to which parameter of the reply just by looking to the matching values. So the values of the parameters in the recorded test data is used to gather the information which is not available by the interface description of the parameters used for the particular test sequence.

It is noted that banking transactions like a remittance order usually require processing of at least three account numbers, namely those of the source and the target account and an internal bank account for internal processing the transaction.

When the above procedure is re-run or re-executed, the sequence of API calls is analyzed for the existing output/input links. The mapping between the parameters of the output/input links is assumed to be the equality of the names.

A)
(search account,o,account internal identifier, 01-01-00.00:00:00), (inquiry account, i, account internal identifier, 01-01-00.00:00:00)
Distance is 3−2=1.
Note that the pair
(create account, o, account internal identifier, 01-01-00.00:00:00), (inquiry account, i, account internal identifier, 01-01-00.00:00:00)
Distance 3−1=2
is not a valid output/input link usable for automated update, because its distance 2 is greater than 1 of the one before.
B)
(search account, o, account internal identifier, 01-01-00.00:00:00), (posting, i, account internal identifier, 01-01-00.00:00:00)
Distance is 4−2=2

At the time the procedure is re-run/re-executed, the APIs 'create account' and 'search account' return the account internal identifier '30-06-01.12:15:00' for the reason of the changed context, which is date and time. The new value '30-06-01.12:15:00' returned by 'search account' is used to replace the input value of the parameter 'account number' by '30-06- 01.12:15:00' for the call of the APIs 'inquiry account' and 'posting' as proposed by the output/input links found. Therefore the procedure can be consistently re-run/re-executed.

Figure 4:
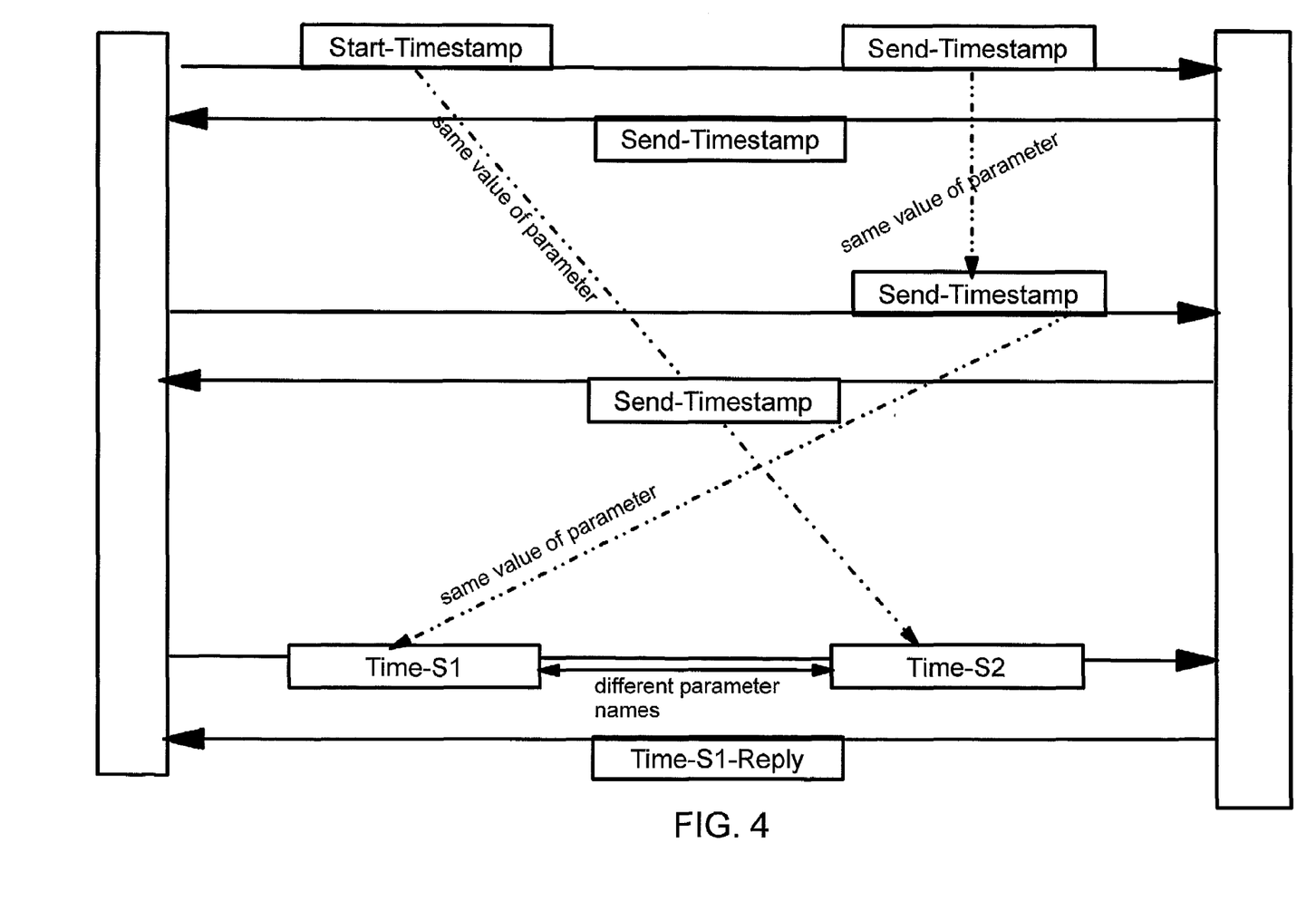
FIG. 4 depicts an example of an automated re-allocation of signatures in an automated regression test in accordance with the invention.

FIG. 4 depicts an example of an automated re-allocation of signatures in an automated regression test in accordance with the invention. The shown example is in the field of financial transactions using bank accounts. Particularly illustrated is a process for providing automatic replacements of timestamps in a transaction protocol.

The underlying problem is that in a lot of synchronous protocols a request is sent with a timestamp which the server system has to send back. The client checks this timestamp in the reply to make sure that the message received is in sequence.

The so called PBM-Protocol (Personal Banking Machine-Protocol) which is used in Millions of ATM (Automatic Teller Machines) installations (FIG. 4) requires such a mechanism. So the ATM sends a timestamp to its authorization server and accepts replies only if the returned timestamp matches. Beside that verification timestamp the client also tells the time when the transaction have been started. This is the time what the customer inserts his card into the card-reader device. So in all requests we have at least two timestamps, the time when the transaction was started and the time when the message was sent. The definition of that parameters (include files) contain a lot of names for such timestamps which mostly do not match exactly in the request and reply parameter structures. So a test driver can't fill the right timestamp without implementing the underlying application logic for that specific protocol.

In order to allow writing to and reading from files in an above described data processing system, a file in the system is opened by its external name. Successfully opening a file, the system returns a file-identifier which has to be used as reference for all subsequent functions like read and write operations on this file. But the actual file handle is dependent on the system state at runtime and cannot be foreseen. Therefore the recorded data contains a file-handle that needs to be updated at the time the regression test is performed.

Figure 5:
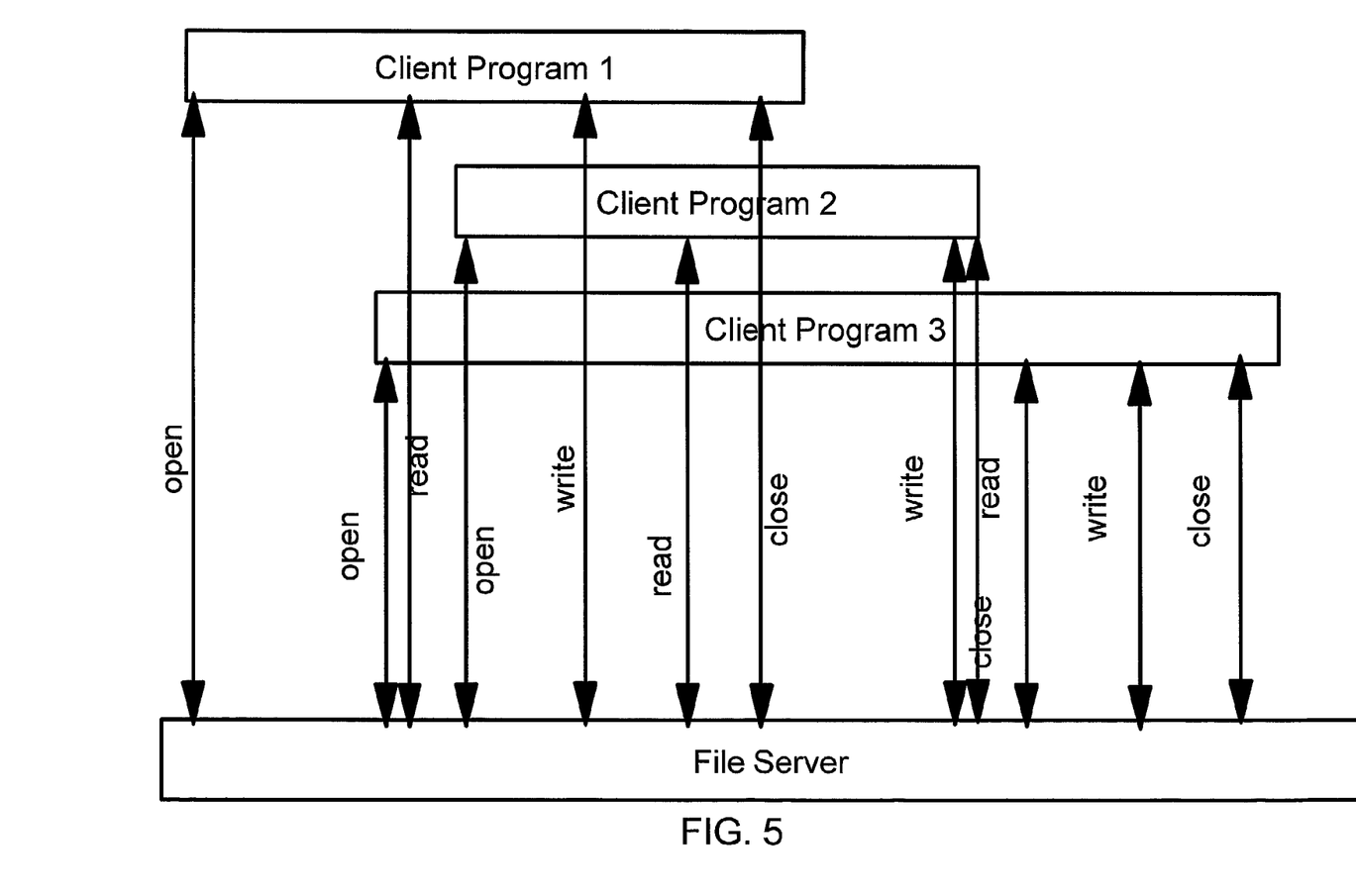
FIG. 5 illustrates an exemplary sequence of function calls for the purpose of function verification wherein using file-handles to perform operations to a file server.

As mentioned above, the test cases and two sets of test data comprising a sequence of function calls and each function call having a set of input and output test data for the purpose of function verification. In FIG. 5 it is illustrated in more detail how the right file-handles are used when performing operations to a file server.

Referring to FIG. 5, a client application program (so-called "thin client") uses a file-server functionality for every file OPEN, READ, WRITE and CLOSE function. The file server provides a message based interface which is defined for the following functions:

1. OPEN
    a) Request
        i. Function-Code (value: OPEN)
        ii. File-Name (value: Logical-File-Name with drive and path).
    b) Reply
        i. Return Code
        ii. File-Handle (value: Integer used as a reference for that file in all subsequent function calls.
2. READ (Sequential)
    a) Request
        i. Function-Code (value: READ)
        ii. File-Handle
    b) Reply
        i. Return Code
        ii. Data read from File (if not "End of File" or any error)
3. WRITE (Sequential)
    a) Request
        i. Function-Code (value: WRITE)
        ii. File-Handle
        iii. Data to Write
    b) Reply
        i. Return Code (tells whether data was written to file.)
4. CLOSE
    a) Request
        i. Function-Code (value: CLOSE)
        ii. File-Handle
    b) Reply
        i. Return Code (tells whether file was closed successfully)

The client program now opens three files by invoking the open function for each. The file handle generated by the server start with 1 to MAXINT in sequence. Because there are many clients in parallel talking to the server no client knows what file-handle he gets assigned to his files.

For regression-testing the functionality of the file server a test with many real client programs (e.g. internet users using a html page containing an applet which talks to the file server via a MQ Series Messaging Client) is required. These clients have to produce a lot of traffic to that file server. So there a many test persons and real client systems required to perform such a regression test of that file server. When the test is completed each file on the server must be there containing correct data (depending on the test cases). The test is successful when a) The return codes of the interfaces are all as expected;
b) The files on the file server contain the expected length and data.

A process of automating such a test could be simply done by recording (tracing) all messages to the server on the middleware (communications) layer and resending them again. If you would just run one instance of a test-driver for re-executing the test, the sequence of each request would be the same and no data in any parameters would have to be changed. But as soon as you separate the test data for as many instances of the test-driver as clients have been used to record the data—the timing conditions for each request are totally different from the one that occurred while the data was recorded. This means that the file-handles that have to be used are totally different, because the OPEN requests received on the server are in a different sequence for each client. Now the replacements of file-handles in all subsequent requests (READ, WRITE, CLOSE) must be performed by using the algorithm of the disclosed invention.

For each file-handle value that have to be replaced to the actual one, the test-driver will find the right value in the return of the already executed OPEN function. Which OPEN function applies to the current requests can be determined by looking into the old values and searching for a match.

So the recorded interface data can be executed again and again for any real happened client-server testing, without performing any specific functionality within the test program. The regression test program is simply a test data executer with does the required modifications by applying the algorithm of this invention.

It should be mentioned that the invention is generally applicable to any regression test of context dependent systems which require dynamic updates on the test data during runtime. For all systems with function interfaces that are defined in a level of detail required for the above described automatic update algorithm, a system independent test apparatus can be build. This apparatus just have to implement the technical interface of the system and does not require any enhancements for the logically changes of the systems interfaces. All regression tests during a typical life-cycle of a system can be accomplished just by replacing the test data with new function tests for any changed or new function. The test apparatus itself does not need to be maintained anymore.

It is understood that the pre-described mechanism can be used accordingly for hardware verification tests like chip layout logic verification test.

What is claimed is:

1. A method for performing regression tests in a state-dependent data processing system where data are processed by means of at least one function having a signature of defined parameters and corresponding values, and wherein a regression test is performed using at least one pre-recorded function test case and at least one pre-determined set of test data corresponding to said signature and being used to execute said at least one pre-recorded function test case, said method comprising the step of adapting said at least one function test case and/or said at least one set of test data to any changed signatures caused by a state transition of said data processing system;

Performing, during a first state of said data processing system, a first test stage of said regression test using said pre-recorded function test case and a first set of test data thus revealing actual test results;

Comparing said actual test results with expected test results, and if the actual test results match with the expected test results, during a second state of said data processing system, performing a second test stage of said regression test using said pre-recorded function test case and a second set of test data, wherein updating the signature used by said second set of test data and/or the at least one set of test data with regard to said state transition from said first state to said second state.

2. Method according to claim 1, wherein said actual test results revealed during said first test stage include first certain values for said at least two parameters which are compared with second certain values for said at least two parameters obtained from said second test stage in order to update said signatures used by said second set of test data or to update said second set of test data, respectively.

3. Method according to claim 1, wherein said step of updating said at least one function test case and/or said at least one set of test data is based on the actual results obtained during said first test stage.

4. Method according to claim 1, wherein said step of updating said at least second set of test data includes updating a specified subset of said at least second set of test data.

5. A computer program product stored on a computer usable medium, comprising computer readable program means for causing a computer to perform a method according to claim 3 when said program is run on said computer.

* * * * *